UNITED STATES PATENT OFFICE.

HENRY B. HOVLAND, OF DULUTH, MINNESOTA.

METHOD OF SULFIDIZING METALS.

1,159,942.  Specification of Letters Patent.  Patented Nov. 9, 1915.

No Drawing.  Application filed July 16, 1915.  Serial No. 40,179.

*To all whom it may concern:*

Be it known that I, HENRY B. HOVLAND, a citizen of the United States, residing at Duluth, county of St. Louis, and State of Minnesota, have invented certain new and useful Improvements in the Method of Sulfidizing Metals; and I do hereby declare the following to be a full, clear, and exact description of the invention, such as will enable others skilled in the art to which it appertains to make and use the same.

The present invention has for its object to provide an improved method of sulfidizing the metallic constituents of ores and other metalliferous materials.

Metals may be extracted from ores or other metal-bearing materials by first bringing the metal into solution by means of a solvent, and then treating with a sulfidizing agent to sulfidize and precipitate the metal as artificial metal sulfid which may be separated by the well-known flotation process.

In a process conducted on a commercial scale, it is of importance that an economical sulfidizing agent be employed and the present invention aims to provide an economical sulfidizing method.

Briefly stated, the improved method consists in bringing together calcium sulfid, ferric sulfate and the solution of the metal to be sulfidized. For the sake of convenience, the method will be described as applied to the recovery of copper from its ores, but it will be understood that the invention is not limited to the treatment of copper ores or even ores in general, but may be applied to the sulfidizing of the metals of all metalliferous materials.

So far as the present invention is concerned, it is immaterial how the metal to be sulfidized is first brought into solution. One method is to grind oxidized ore to a suitable fineness and to treat the ground ore with sulfuric acid until the soluble contents of the ore is in the form of sulfate. When copper ore is treated, the addition of the sulfuric acid forms copper sulfate. Calcium sulfid and ferric sulfate are then added in sufficient amounts to the pulp and copper-bearing liquor to precipitate the copper present in the form of copper sulfid. As soon as the calcium sulfid and ferric sulfate are added to the copper liquor, a reaction takes place and the copper is sulfidized. While the presence of free acid in the solution is not necessary, it has been found advantageous to provide some acid in order to utilize to the fullest extent, the sulfur contained in the calcium sulfid and the ferric sulfate.

If calcium sulfid is added to the metal solution alone, metal sulfids will not be precipitated as the desired reaction will not take place. When ferric sulfate and calcium sulfid, however, are used, the ferric sulfate facilitates the conveyance of the sulfur to the metal to be sulfidized.

This method of sulfidizing is economical for the reason that calcium sulfid may be prepared at low cost in any locality where there is lime or limestone and sulfurous acid, free sulfur or metal sulfids available. For instance, lime or limestone and a metal sulfid may be mixed and heated to form a calcine, which has been found to be a satisfactory calcium sulfid containing substance for the present purpose as it is immaterial whether the calcium sulfid is pure or mixed with other substances. Or, the calcium sulfid may be prepared in localities where native gypsum occurs, especially in localities where the gypsum is found interbedded with coal measures affording the reducing agent for reducing the calcium sulfate to calcium sulfid, which latter is then quite pure and serviceable as a sulfidizing agent. The ferric sulfate may be prepared in ordinary roasting operations in any locality where there is available iron sulfid or iron oxids and sulfur-yielding compounds.

As above stated, the invention is not limited to the treatment of copper ores, as the metal of any metalliferous material may be brought into solution and then precipitated by means of the calcium sulfid and ferric sulfate, in the form of a sulfid of the metal to be recovered.

What I claim is:—

1. The method of treating metalliferous materials which consists in bringing the metallic constituents into solution and sulfidizing the metallic constituents by means of calcium sulfid and ferric sulfate.

2. The method of treating copper-bearing ores which consists in bringing the copper into solution and precipitating the copper as copper sulfid by means of calcium sulfid and ferric sulfate.

3. The method of sulfidizing metal which consists in bringing together a solution of the metal to be sulfidized, calcium sulfid and ferric sulfate.

4. The method of precipitating the metal from a metal-containing solution which consists in treating the solution with calcium sulfid, ferric sulfate and an acid.

5. The method of sulfidizing metal which consists in treating a solution of the metal to be sulfidized with ferric sulfate in the presence of calcium sulfid.

In testimony whereof I affix my signature.

HENRY B. HOVLAND.

Copies of this patent may be obtained for five cents each, by addressing the "Commissioner of Patents, Washington, D. C."